United States Patent [19]

Lynch

[11] 4,424,563

[45] Jan. 3, 1984

[54] DATA PROCESSOR INCLUDING A MULTIPLE WORD PROCESSING METHOD AND DEVICE

[75] Inventor: Todd R. Lynch, Albany, Oreg.

[73] Assignee: Hewlett-Packard Company, Palo Alto, Calif.

[21] Appl. No.: 184,581

[22] Filed: Sep. 5, 1980

[51] Int. Cl.³ .......................... G06F 9/00; G06F 9/02
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,109,310 | 8/1978 | England et al. | 364/200 |
| 4,251,864 | 2/1981 | Kindell et al. | 364/200 |
| 4,258,419 | 3/1981 | Blahut et al. | 364/200 |

OTHER PUBLICATIONS

J. Stein, "Single Chip Microprocessors Move into Sixteen Bit Arena," Electronic Design News (EDN), Feb. 20, 1975, p. 26.

*Primary Examiner*—James D. Thomas
*Assistant Examiner*—Archie E. Williams
*Attorney, Agent, or Firm*—Patrick J. Barrett; Douglas A. Kundrat

[57] ABSTRACT

An initialization routine provides to a CPU an instruction to be executed and multiple words of input data to be processed by the instruction. The CPU stores the input data in consecutive locations of a register having a boundary after the last word of stored input data. The CPU executes the instruction on each word of input data in sequence until the boundary is reached and the results are combined to form one word of processed data.

3 Claims, 23 Drawing Figures

| INDIRECT LEVEL | DIRECT LEVEL | IMMEDIATE LEVEL | ADDRESSING MODE |
|---|---|---|---|
| DR←M[M[ADR]] | DR←M[ADR] | DR←LITERAL | LITERAL |
| DR←M[M[AR]] | DR←M[AR] | DR←AR | REGISTER |
| DR←M[M[AR+ADR]] | DR←M[AR+ADR] |  | INDEX |
| DR←M[M[AR]]<br>AR←AR±2 | DR←M[AR]<br>AR←AR±B |  | STACK |

FIGURE 2

| SYMBOL | DEFINITION |
|---|---|
| ARP | ADDRESS REGISTER POINTER |
| DRP | DATA REGISTER POINTER |
| AR=R[ARP] | ADDRESS REGISTER |
| DR=R[DRP] | DATA REGISTER |
| R[x] | LOCATION IN REGISTER BANK 131 ADDRESSED BY x |
| M[x] | LOCATION IN STORAGE UNIT 105 ADDRESSED BY x |
| PC | PROGRAM COUNTER |
| SP | STACK POINTER |
| EA | EFFECTIVE ADDRESS |
| ADR | ADDRESS |
| $\bar{x}$ | COMPLEMENT OF x |
| y←x | y IS REPLACED BY x |
| 0→ | SHIFT RIGHT AND FILL WITH ZEROS |
| ⊕ | EXCLUSIVE OR |
| v | INCLUSIVE OR |

FIGURE 7

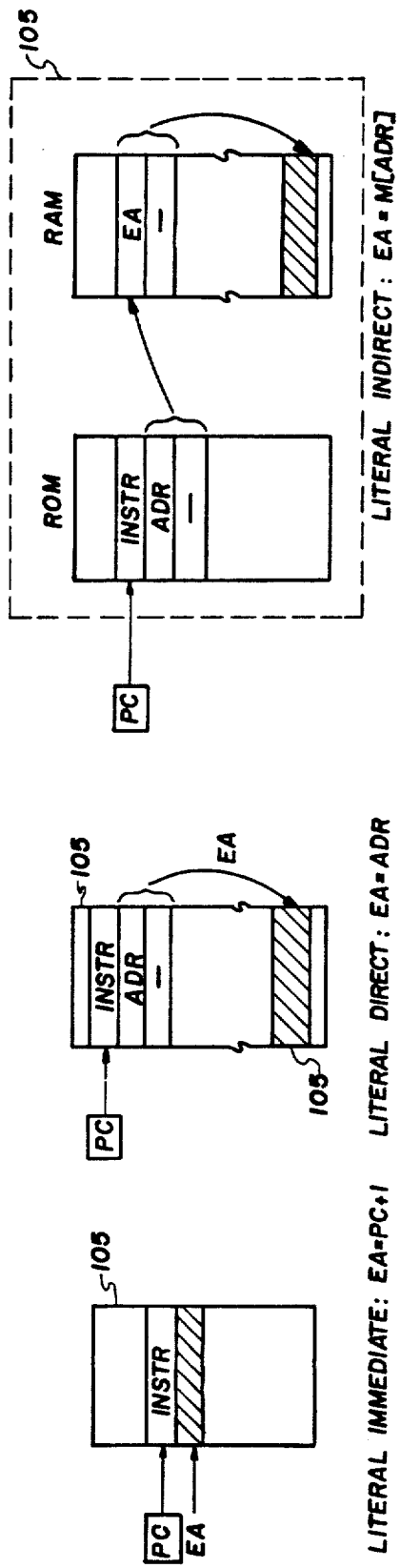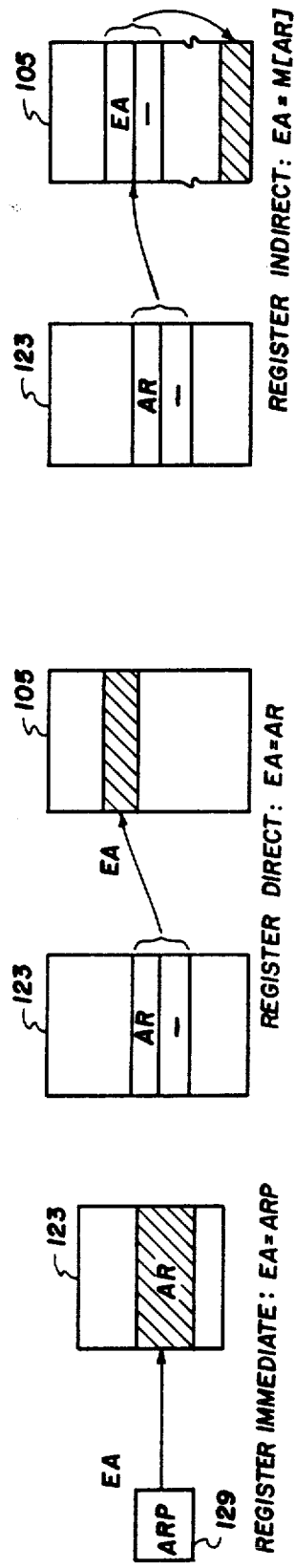

INDEX DIRECT: EA = AR + ADR

INDEX INDIRECT: EA = M[AR + ADR]

INCREASING STACK

DECREASING STACK

| SYMBOL | STATUS FLAG |
|---|---|
| DCM | DECIMAL MODE |
| E | EXTEND REGISTER |
| CY | CARRY |
| OVF | OVERFLOW |
| LSB | LEAST SIGNIFICANT BIT |
| MSB | MOST SIGNIFICANT BIT |
| Z | ZERO |
| LDZ | LEFT DIGIT ZERO |
| RDZ | RIGHT DIGIT ZERO |

FIGURE 10

| $\overline{LMA}$ | $\overline{RD}$ | $\overline{WR}$ | DEFINITION |
|---|---|---|---|
| 1 | 1 | 1 | NOP |
| 1 | 1 | 0 | WR |
| 1 | 0 | 1 | RD |
| 1 | 0 | 0 | DMA GRANT |
| 0 | 1 | 1 | LMA |
| 0 | 1 | 0 | LMWR |
| 0 | 0 | 1 | LMRD |
| 0 | 0 | 0 | INTACK |

FIGURE 13

DATA PROCESSOR INCLUDING A MULTIPLE WORD PROCESSING METHOD AND DEVICE

BACKGROUND AND SUMMARY OF THE INVENTION

In general, the present invention relates to central processing units (CPUs) and, more particularly, to CPUs which are operative for processing variable length data elements. CPUs which are constructed according to the prior art have, in general, been limited to processing input data one word at a time although it is known in the prior art to process multiple words of input data by utilizing an iterative loop algorithm to initialize the CPU for each word of data to be processed by a single instruction. Since the algorithm must typically be contained within the multiple word processing instruction, a potential source of programmer error is introduced and an inordinate amount of CPU processing time is wasted.

In accordance with the illustrated preferred embodiment of the present invention, a CPU initialization routine contains various instructions which are to be executed and the addresses of input data words on which each instruction is to be executed. When a particular instruction is to be executed by the CPU, the input words of data to be processed thereby are stored at consecutive locations in a register bank with a boundary located just after the last word of data. The CPU executes the particular instruction on the input data one word at a time and increments a pointer to indicate the word being processed. Overflow and carry information is retained so that the instruction generates a single word of processed data from the multiple words of input data. Execution of the instruction is finished when the pointer reaches the register boundary and execution of the next instruction stored in the initialization routine may be begun. Thus, the CPU processes multiple words of input data with single instructions without the use of an iterative loop initializing algorithm.

BRIEF DESCRIPTION OF THE DRAWINGS

FIG. 2 depicts the address instructions for the four addressing modes used in the CPU shown in FIG. 1.

FIGS. 3A-C illustrate the three levels of literal addressing which are used by the CPU shown in FIG. 1.

FIGS. 4A-C illustrate the three levels of register addressing which are used by the CPU shown in FIG. 1.

FIG. 7 lists symbols and associated definitions used in conjunction with the CPU shown in FIG. 1.

FIG. 10 lists the status flags and associated definitions used in conjunction with the CPU shown in FIG. 1.

FIG. 13 lists the composite bus signals which are used in the CPU shown in FIG. 1.

DESCRIPTION OF THE PREFERRED EMBODIMENT

Figure 1:
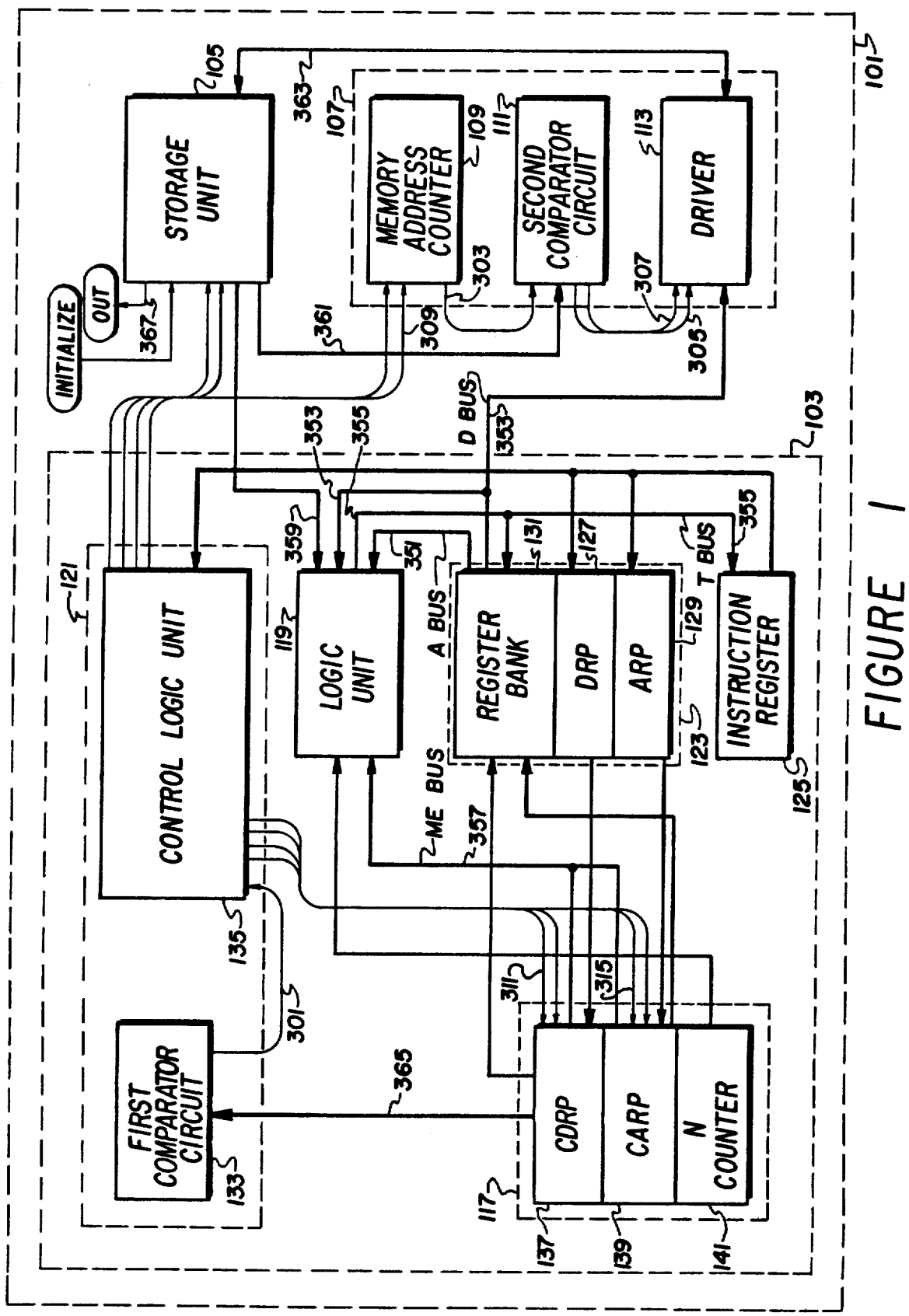
FIG. 1 is a block diagram of a CPU which is constructed in accordance with the preferred embodiment of the present invention.

FIG. 1 is a block diagram of a multiple word processing device (CPU 101) which is constructed in accordance with the present invention. CPU 101 comprises a storage unit 105, a memory controller 107, an instruction register 125, a register unit 123, a counter unit 117, a logic unit 119, and a control unit 121. Memory controller 107 comprises a memory address counter 109, a second comparator circuit 111, and a driver 113. Register unit 123 includes a 64 location register bank 131, a DRP register 127 for storing a destination address (D), and an ARP register 129 for storing a source address (A). Control unit 121 includes a first comparator circuit 133 and a control logic unit 135.

Busses internal to CPU 101 carry data, addresses, and instructions and are depicted as bold lines in FIG. 1. Second comparator circuit 111 is operative for causing driver 113 to place data on the data busses and first comparator circuit 133 is capable of issuing a "repeat" command. The data and address busses carry eight-bit parallel words and the data busses may be used to transport time-multiplexed multiple word data or 16-bit addresses or instructions. Time-multiplexing creates a serial string which may include literal or numeric strings of data on which arithmetic operations may be performed.

Since the addresses which are used in CPU 101 are composed of two digital words which are stored in consecutive memory locations, the address of the second location may be found simply by incrementing the address of the first location. Thus, it is only necessary to specify the address of the first location. Similarly, since the strings of multiple word data are stored in consecutive memory locations, it is only necessary to specify the location of the first word of data. It should be noted that a boundary is located in memory after the last word of data and that the destination address, D, specifies the location in memory of the first word of data.

FIG. 2 summarizes the address instructions for the four addressing modes (literal mode, register mode, index mode, and stack mode) with exemplary load instructions. DR refers to a register location at register address D, AR refes to a register location at register address A, and ADR refers to a two-word address which is stored at a location directly following the location of an instruction with the literal direct, literal indirect, index direct or index indirect addressing modes. The symbol M[x] refers to a location in storage unit 105 at an address x where x is a 16-bit address. M[M[x]] refers to a location in storage unit 105 the address of which is stored at location M[x] where both x and M[x] are 16-bit addresses. The symbol B refers to the number of words which are moved by a multiple word instruction. An effective address EA is a location at which data is found for a load-type instruction or a location at which data is placed by a store-type instruction. In a load instruction, EA is the address of the first word of data to be accessed and in a store instruction, EA is the address of the location at which the first word of data is to be stored.

FIGS. 3A-C depict schematically the three levels of the literal addressing mode (immediate, direct, and indirect). FIGS. 4A-C depict the three levels (immediate, direct and indirect) of the register addressing mode which allow locations in register bank 131 to store addresses as well as data.

Figure 5A:
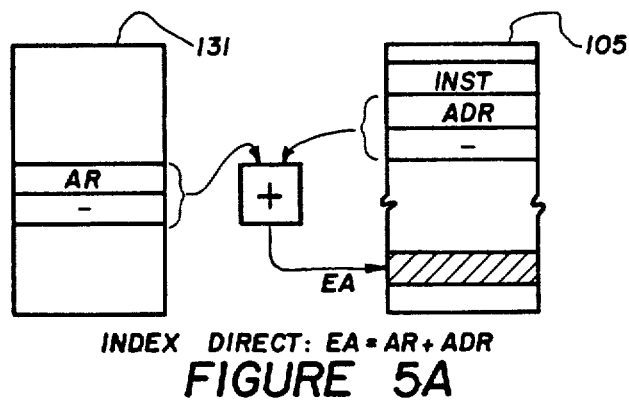
FIGS. 5A-B illustrate the two levels of index addressing which are used by the CPU shown in FIG. 1.
Figure 5B:
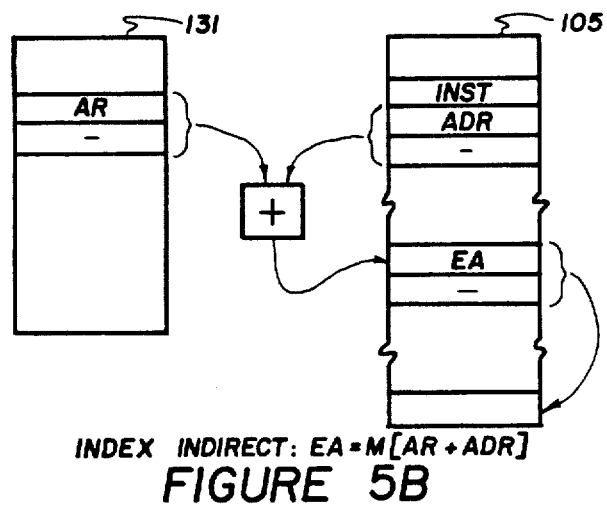
Figure 6A:
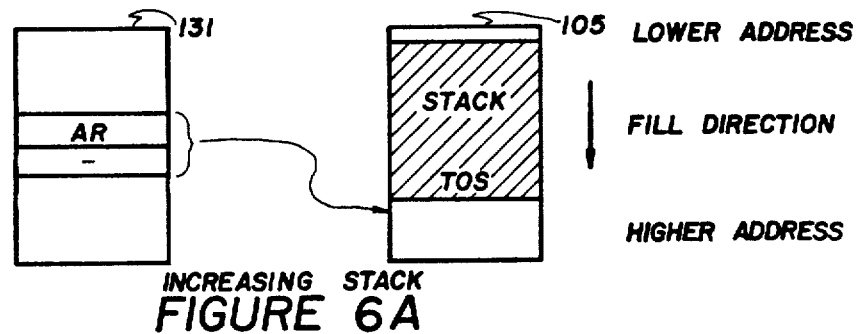
FIGS. 6A-B depict increasing and decreasing stacks which are used in the register bank of the CPU shown in FIG. 1.
Figure 6B:
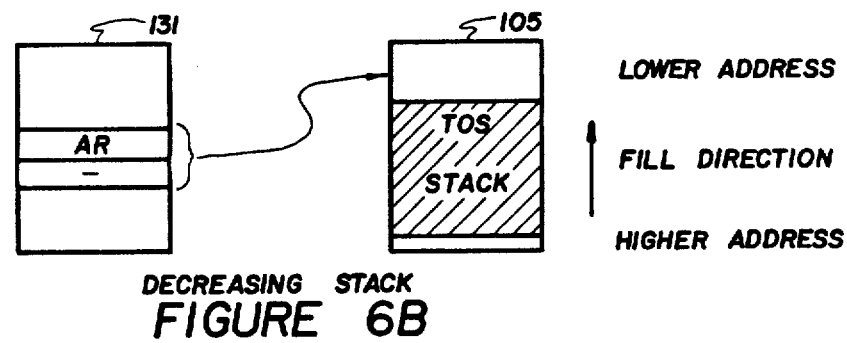

FIGS. 5A-B depict the two levels (indirect and direct) of the index addressing mode which is useful for accessing data stored in a table such as a matrix. In the index mode a fixed base address is added to an offset to create a desired address, and neither the base nor the offset is altered. Locations 2 and 3 of register bank 131 are used for this addition and for storage of the resultant sum following an index instruction. FIGS. 6A-B depict the two levels of the stack addressing mode. The stack addressing mode is useful when data and/or addresses can be used in a first-in/last-out manner. A stack pointer (SP) is stored at location AR and multiple stacks may be handled by utilizing multiple stack pointers within register bank 131. A stack is activated by setting ARP equal to the location of its stack pointer, SP. Hardware limitations usually require that for an increasing stack AR point to the next available location in the stack and for a decreasing stack AR point to the occupied location at the top of the stack. The two possible stack operations are a "push" operation which enters data into the stack to fill it and a "pop" operation which removes data from the stack to empty it. In the stack direct mode the stack is presumed to contain data. For the stack indirect mode the stack is presumed to contain an ordered list of addresses which point either to read locations for pop operations or to store locations for push operations.

The addressing modes impose particular format requirements upon memory reference instructions including load, store, pop, push, AND, compare, subtract, add, and subroutine jump. All of the instructions except subroutine jump and logical AND are available in both single and multiple word modes. Logical AND is available only as a multiple word operation. The arithmetic instructions (add, subtract, and compare) have meanings which differ in binary and decimal modes. The number of words referenced is a function of the multiple word mode and the distance between DR and the next boundary in register bank 131. The character "B" indicates the number of words moved by a given instruction.

Control logic unit 135 decodes instructions into a series of read (RD) and write (WR) commands which either load data and addresses onto busses or store data and addresses from busses into registers. Before any instruction referencing AR or DR may be used, pointer ARP 129 is loaded with the address of AR and pointer DRP 127 is loaded with the address of DR. Values for ARP and DRP are octal numbers from 00 to 77.

FIG. 7 lists various symbols which may aid the understanding of the instructions listed in Appendix 1. DRP 127 and ARP 129 (shown in FIG. 8) are six-bit registers which are used to point into register bank 131. AR is a register location which is addressed by ARP 129 and DR is a register location which is addressed by DRP 127. The program counter (PC) resides in registers 4 and 5 of register bank 131 and is used to address a particular instruction being executed. The stack pointer (SP) resides in registers 6 and 7 of data address register 131 and is used to point to the next available location on the return address stack. During subroutine jump and returns, SP is manipulated by hardware. The complement of x is a one's complement if DCM=0 and a nine's complement if DCM=1, where DCM is a decimal mode flag.

Figure 8:
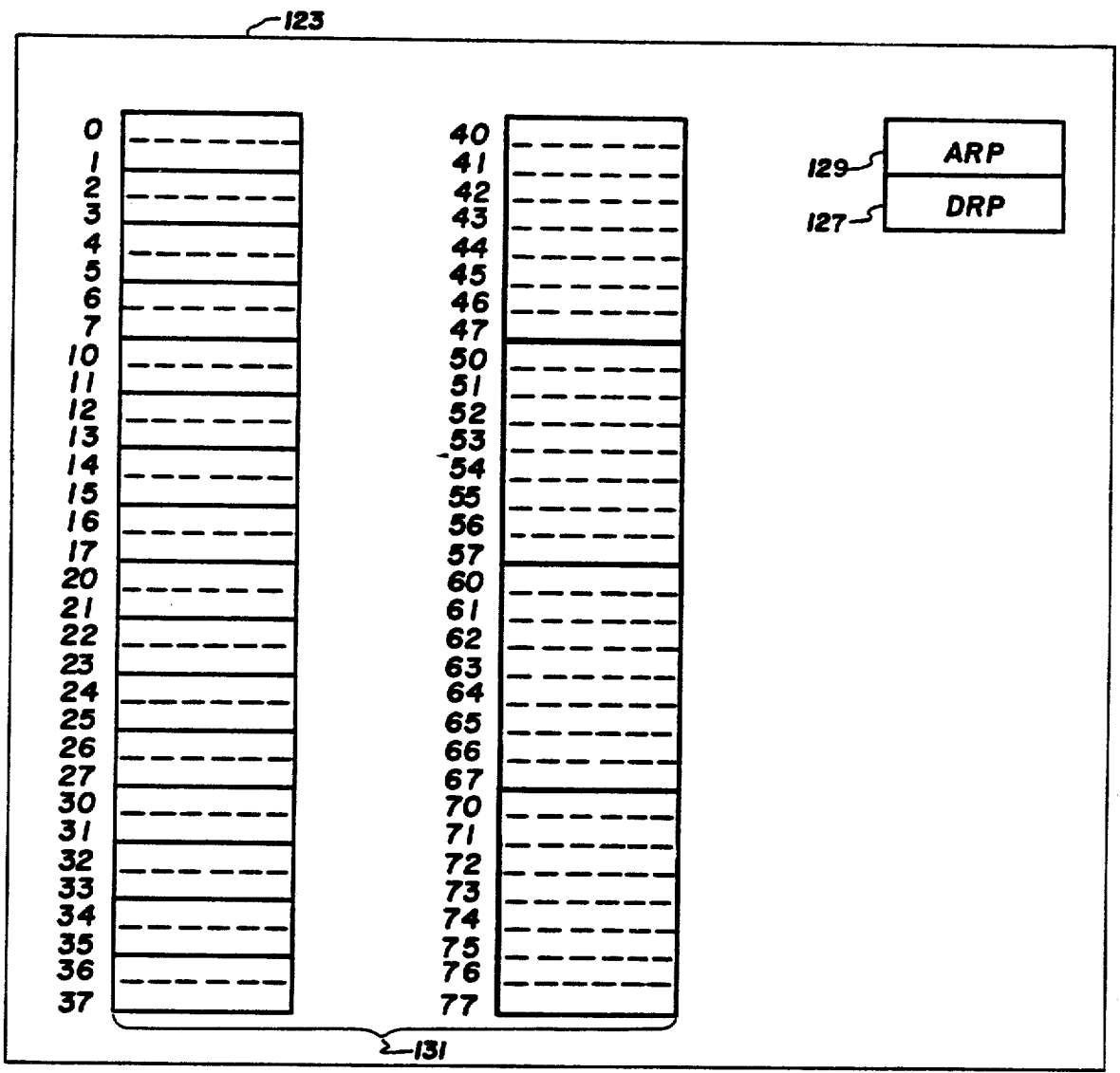
FIG. 8 is a diagram of a register bank used in the CPU shown in FIG. 1.

FIG. 8 illustrates the organization of register unit 123. Register unit 123 includes a register bank 131 having 64 eight-bit registers, a sixteen-bit ARP register 129, and a sixteen-bit DRP register 127. The registers of register bank 131 are numbered octally from 00 to 77. Internal boundaries within register bank 131 exist following registers 1, 3, 5, 7, 11, 17, 21, 23, 25, 27, 31, 33, 35, 37, 47, 57, 67 and 77. These boundaries, depicted by heavy solid lines, are programmed into first comparator circuit 133 at assembly. The first sixteen boundaries mark off two registers each to form segments suitable for storage of two-word addresses. The last four boundaries mark off eight registers each to form sections suitable for storage of either data or addesses. These eight-register sections limit operating commands to no more than eight words of data before the iterative loop hardware is exited and infinite loops are thereby avoided.

Figure 9:
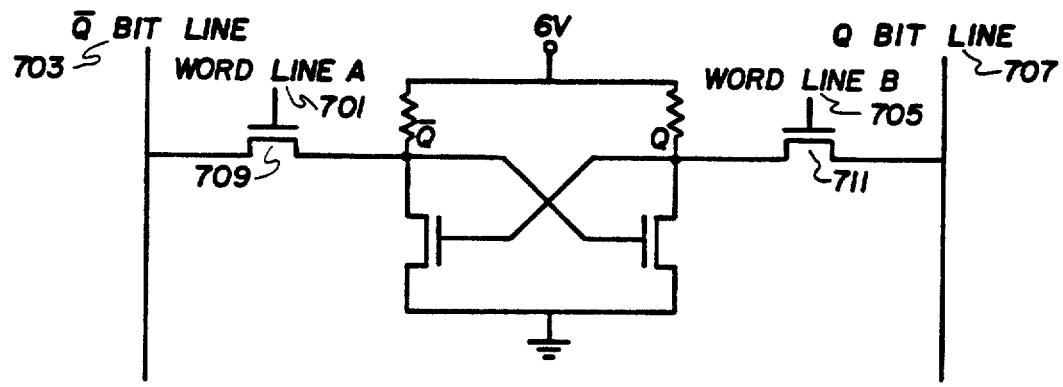
FIG. 9 depicts a two-read/one-write memory cell which is used in the register bank shown in FIG. 8.

Each register of register unit 123 is a modified static RAM cell comprising a two-read/one-write memory cell of the type described by J. Stein at page 26, et. seq., of *Electronic Design News*, Feb. 20, 1975, which allows access to two words of data upon receipt of two associated addresses. In operation, two words are read from memory, operated on in logic unit 119, and the result is entered into one of the accessed register locations. FIG. 9 illustrates the two independently controlled word lines which allow the contents of the register to be read two words at a time. Word line A 701 enables complement information to be read out onto line 703 and word line B 705 enables true information from another or the same cell to be read out on line 707. In FIG. 1, line 703 is denoted as DBUS 353 and line 707 is denoted as ABUS 351. Date on ABUS 351 can be complemented in logic unit 119 to allow manipulation of data with proper relative signs.

Address A, stored in ARP 129, is a source address for an operating instruction which is to be performed by CPU 101. Address D, stored in DRP 127, is a destination address for the operating instruction (except during a store operation when D is a store address). A, D, and an operating instruction are entered by a programmer as part of an initialization routine.

FIG. 10 lists various status flags which may aid the understanding of the instructions listed in Appendix 1. DCM designates a decimal mode flip-flop which, when set, indicates that decimal operations are to be performed and when cleared, indicates that binary operations are to be performed. E designates a 4-bit extend register which can be used for data movement only when DCM is set. The E register can be cleared, incremented, or decremented independently of DCM and no other instruction affects E. CY denotes a one bit carry flip-flop, dependent on DCM, which is loaded with the carry out of the most significant bit of a word of processed data during any arithmetic data movement operation. OVF denotes an overflow flip-flop which indicates an overflow when the sign of a computed result is incompatible with the sign of the operands and the operation performed. A least significant bit flip-flop (LSB) is affected only by the least significant bit of the result of all data movement instructions and a most significant bit flip-flop (MSB) is affected only by the most significant bit of the result of all data movement instructions. A zero flip-flop (Z) is set if a data movement instruction produces an all-zero result and is cleared if the result is non-zero. A left digit zero flip-flop (LDZ) is set if the most significant four bits of a data movement result is 0000. A right digit zero flip-flop (RDZ) is the least significant four bits of a data movement result is 0000. The CY and OVF status flags are the most important flags for multiple word processing since accurate multiple word processing requires retention of carry and sign-change information from one data word to the next. Status information is based on an entire single or multiple word string passing through logic unit 119 and a signal (EXAM=1) may be used to call up status information for use by control logic unit 135.

Figure 11:
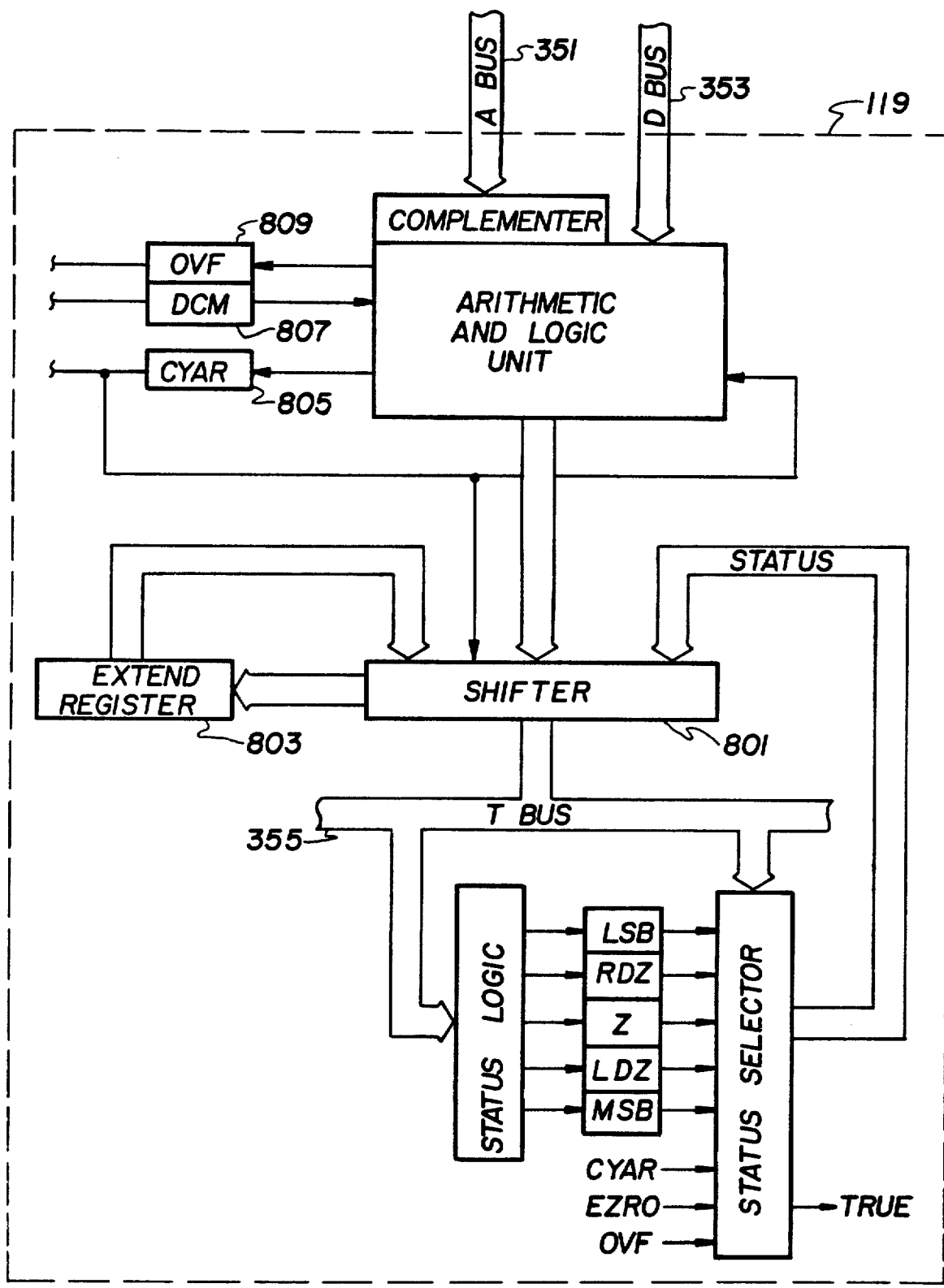
FIG. 11 depicts the logic unit which is used in the CPU shown in FIG. 1.

FIG. 11 shows logic unit 119 which performs data and address manipulations in a mode specified by the DCM flip-flop. The arithmetic and logic functions performed by logic unit 119 include binary add, decimal add, one's complement, logical AND, inclusive OR, and exclusive OR. Shifting is handled by an appended multiplexer 801.

Manipulation of data and addresses is accomplished by the load (LD), store (ST), compare (CM), add (AD), subtract (SB), logical AND (ANM), push (PU) and pop (PO) instructions. LD loads DR with the contents of EA. ST stores DR in a location pointed to by EA. CM causes the contents of EA to be subtracted from DR with the subtraction result affecting only status. AD causes the contents of EA to be added to DR and the result of the addition is stored in DR. The SB causes the contents of EA to be subtracted from DR and the result of the subtraction is stored in DR. ANM causes the logical AND of DR and the contents of EA to be loaded into DR. PU causes DR to be stored in a location specified by EA and modifies AR which acts as a stack pointer. PO causes the contents of EA to be loaded into DR and modifies AR which acts as a stack pointer.

Flip-flop registers CY 805, OVF 809, and DCM 807 are also contained in logic unit 119. All control signals for logic unit 119 are generated in control unit 121. Logic unit 119 further generates status flags in response to an instruction and either a single or multiple word operand. The increment instruction (IC) and the decrement instruction allow access to data and addresses in consecutive registers of register bank 131 without the necessity of addressing each register individually. Logic unit 119 handles shift operations with shifter 801 such as extended left (EL), logical right (LR), extended right (ER), and logical left (LL) instructions which shift data in groups of one to eight words. The signals to both shifter 801 and E register 803 are generated in control unit 121. Logic unit 119 also performs logical operations such as the exclusive OR (XR) and inclusive OR (OR) operations which load DR with the chosen "or" of DR and AR and clear both OVF and CY. The destination of a jump subroutine operation (JSB) is EA and the return address is saved at a location pointed to by stack pointer SP. SP is then incremented by two. The return from subroutine (RTN) instruction decrements SP by two and the return address is read off of the stack and written into PC.

Manipulation of data and addresses in data address register 131 is performed with the aid of a time-multiplexed eight bit bus and a precharging scheme for transferring data, addresses and commands. When more than one word of data is sent along the bus, an address for only the first word is needed and remaining data is presumed to be in consecutive locations. Control logic unit 135 implements this presumption by incrementing address counters 109, 137, and 139 whenever a read or a write signal is used, and the movement of addresses along the bus is thereby minimized.

Figure 12:
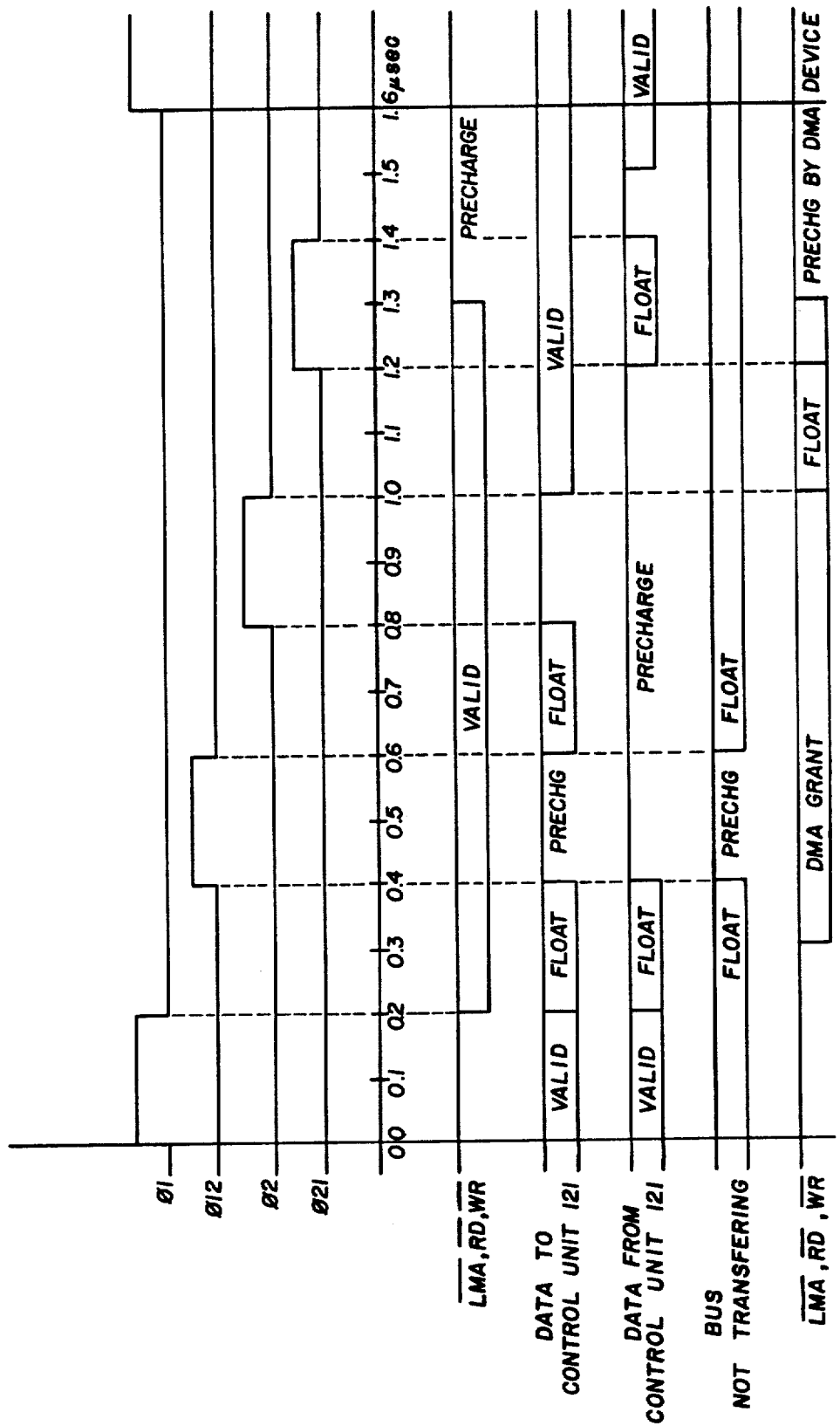
FIG. 12 is a timing diagram of the CPU shown in FIG. 1.

FIG. 12 is a timing diagram which shows the relationship of four distinct voltage pulses from four phase clocks. When control unit 121 is "listening," the precharge period is surrounded by protective float times which assure that the precharge period does not overlap valid periods. Precharging reduces hardware drive requirements. Each of storage unit 105, memory controller 107, and control unit 121 charge the bus lines to a logical one during pulse $\phi 12$. Later in the timing cycle the component selected to "speak" either actively holds the bus at one or actively discharges the bus to zero. If control unit 121 is to "speak" on the bus, either LMA or WR is set to 0 and control unit 121 precharges during pulse $\phi 12$ and continues to hold the bus at a logical one until the rise of pulse $\phi 21$. The bus floats during pulse $\phi 21$ and is driven valid with the fall of $\phi 21$. If no component is speaking on the bus, the bus is precharged during pulse $\phi 12$ and floats until the next pulse $\phi 12$.

Control unit 121 includes control logic unit 135 and first comparator circuit 133. Control logic unit 135 is a programmable logic array which coordinates all data processing operations. The NOR-NOR logical structure of control logic unit 135 is programmed according to coding tables A2-1, A2-2, and A2-3 of Appendix 2. At the beginning of each cycle the current state of the machine, the code of the instruction being executed, and the status are input to control logic unit 135. The outputs of control logic unit 135 notify the various components of CPU 101 of the states and operations for the upcoming cycle. The repeat (RPTE) signal is received by control logic unit 135 from first comparator circuit 133 along line 301 after comparator circuit 133 examines a newly incremented D address. FIG. 10 illustrates the circuitry used to implement RPTE. The defining equation of RPTE is:

RPTE = I$\phi$ (SHR = CDRP$\phi$)v I$\phi$ CDRP5 (SHR = CDRP2 v SHR·CDRP1), where I$\phi$ is the least significant bit of instruction in the multiple word mode, SHR indicates a shift right instruction and CDRP is the DRP counter register which is incremented for everything except a SHR instruction in which case CDRP is decremented. When RPTE=1, processing is repeated with the same instruction on the next word in the string of data; when RPTE=0, processing of the multiple word instruction is complete. RPTE is a one if one of the first three operations is a multiple word SHR or if CDRP5 is a one. CRDP5 is a one if the instruction contains more than two read or write instructions.

Control unit 121 controls storage unit 105 and external input/output devices using three control signals: load memory address (LMA), write (WR), and read (RD). Each combination of the three signals indicates whether address or data information is on the bus and which components are to drive the bus during the upcoming cycle. Control logic unit 135 controls these three signal lines unless a grant of direct memory access (DMA) has been given to another controller. A HALT signal of zero causes control unit 121 to complete the current instruction and then to release control of the bus and to go into an idle loop waiting for HALT to go to one. When IRL is zero, control unit 121 completes the current instruction, saves the program counter on top of the stack, and initiates entry to an interrupt service routine.

FIG. 13 lists composite bus signals for the eight possible combinations of the three control signals. NOP indicates no bus activity. WR indicates that the bus data is to be written into the previously addressed location on the rise of pulse $\phi 1$. RD indicates that the contents of the previously addressed location are placed on the bus gated by pulse $\phi 2$. DMA grant, in response to HALT going to zero, floats the control lines and allows a DMA driver to control the bus without interference from control unit 121. LMA indicates that one word of a two word address is on the bus and is to be loaded into the register bank during pulse $\phi 1$. LMWR never occurs. LMRD indicates that the contents of a previously addressed location are placed on the bus and are used as one word of a two word address to be loaded into the register bank during pulse $\phi 1$. INTACK indicates that control unit 121 issues a signal, in response to IRL going to zero, to instruct the interrupting chip to put its address on the bus.

Data and all signals from control logic unit 135 must be validated before being placed on a bus. Commands must be validated in a period beginning with the rise of a $\phi 12$ high pulse and ending with the rise of a $\phi 21$ pulse. If data is to be read, driver 113 begins to drive the bus during pulse $\phi 2$ and the data must be valid before the rise of the next $\phi 12$ pulse. When control unit 121 commands that an address or data be transferred on a bus, the address or data must be validated during th $\phi 1$ pulse. Driver 113 is not enabled until data has been validated and each bus is precharged to a logical one before data is placed on it. Placement of a bit of data comprising a logical one on a bus is accomplished by maintaining the charge on a bus and placement of a bit of data comprising a logical zero is accomplished by discharging the bus. During one clock cycle (comprising pulses $\phi 1$, $\phi 12$, $\phi 2$, and $\phi 21$ shown in FIG. 12), CPU 101 has the ability to access a preaddressed memory location, read the contents thereof into storage unit 105, add said contents to the contents of a register in register bank 131 and store the sum in a register of register bank 131.

Figure 15:
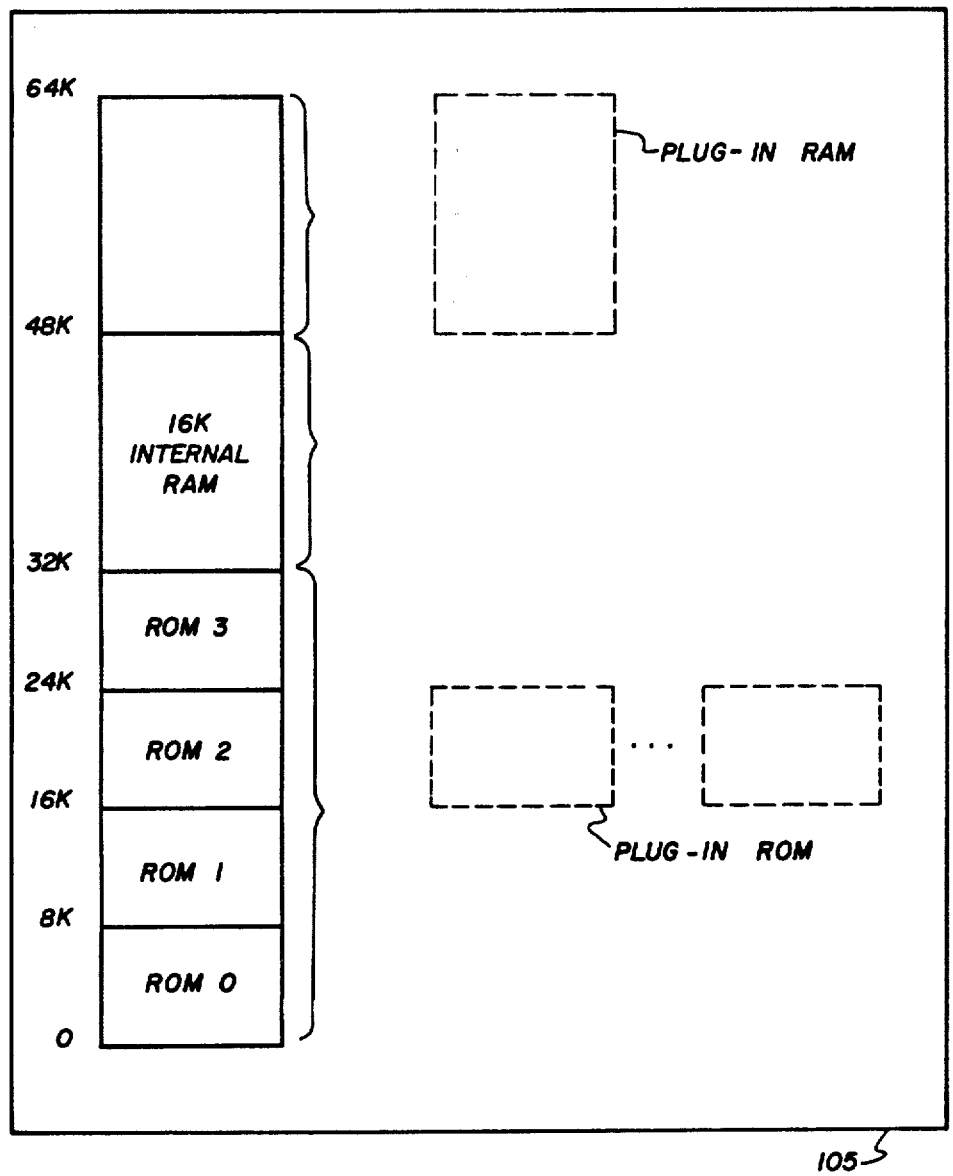
FIG. 15 is a diagram of the storage unit which is used in the CPU shown in FIG. 1.

Memory controller 107 monitors the activities of control logic unit 135 and logic unit 119 to maintain data processing within storage unit 105. Memory controller 107 comprises memory address counter 109, second comparator circuit 111, and driver 113. Memory address counter 109 increments the memory address each time a RD or WR command is issued to ensure that the CPU 101 is always prepared to process the next word of data. Second comparator circuit 111 includes storage for the addresses of the external boundaries of memory controller 107. Each time the address in memory address counter 109 is incremented, second comparator circuit 111 receives the incremented memory address on bus 303 and compares the incremented memory address to the stored boundary addresses. If the incremented memory address is between the two stored boundary addresses, then the incremented memory address is within storage unit 105 and second comparator circuit 111 activates driver 113 via line 305 or line 307 to transfer processed data only in response to a RD command and only if the data is from an address which is located in storage unit 105. If additional plug-in memory units are used, memory controller 107 prompts CPU 101 to access the additional memory units one at a time. FIG. 15 illustrates the provision for plug in memory units to expand the storage capacity of storage unit 105.

Instruction register 125 comprises an eight bit register which receives data from storage unit 105 via bus 359, logic unit 119, and T BUS 355. Counter unit 117 includes CDRP 137, CARP 139, and an N counter 141. Counters CDRP 137 and CARP 139 provide access to successive register locations which follow locations initially pointed to by ARP 129 and DRP 127. At the beginning of an instruction execution the counters 137 and CARP 139 are loaded with the contents of ARP 129 and DRP 127. If a multiple word instruction is to be executed, counters CDRP 137 and CARP 139 are incremented or decremented on each succeeding cycle. N counter 141 is a four-bit register which is used to keep track of the program counter offset during consecutive accessing of storage unit 105. The program counter (PC), which is stored in register bank 131, is updated at the beginning of most instructions by adding the contents of N counter 141 to the current value of PC in response to a signal from control logic unit 135. CARP 139 is an increment-only counter which can start at any octal value between 00 and 77 and an increment to address 77 yields the location zero in register bank 131. CDRP 137 can be incremented or decremented and decrementing is used only for multiple word shift right instructions. ARP 129, DRP 127, CARP 139 and CDRP 137 and all controlled by signals from control logic unit 135.

Figure 14:
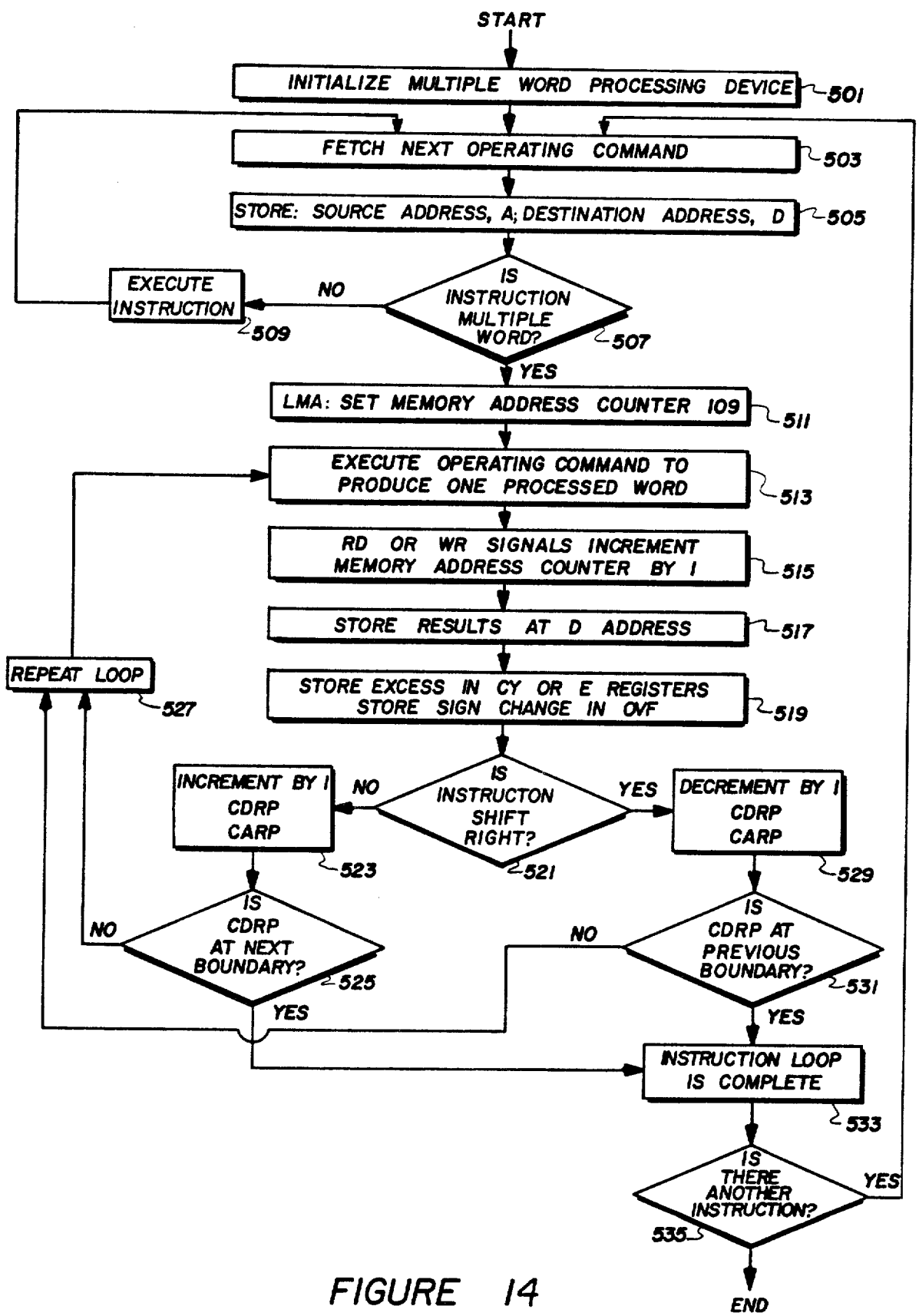
FIG. 14 is a flow diagram which illustrates the multiple word processing steps which are performed by the CPU shown in FIG. 1.

FIG. 14 is a flow diagram of the operations which are performed by CPU 101 during multiple word processing. At block 510, CPU 101 is initialized via an initialization routine from, e.g., a programmer. The initialization routine provides a series of operating instructions to be performed, and both a source address, A, and a destination address, D, of a string of data words to be processed by each operating command. The initialization routine is stored in storage unit 105. In block 503, logic unit 119 enters the first operating instruction of the initialization routine into instruction register 125. In block 505, the source address A is loaded into ARP 129 and the destination address D is loaded into DRP 127.

The arithmetic difference between destination address D and the next boundary address in register bank 123 is the number of words of data to be processed by the operating instruction. If, at block 507, the number of words to be processed is one, processing is accomplished with known methods at block 509. If the number of words to be processed is greater than one, multiple word processing is accomplished as described below. ME BUS 357 provides logic unit 119 with the number of words to be processed and to be either pushed on or popped off the data stack in register bank 131.

Processing of data begins, at block 511, with control logic unit 135 issuing an LMA signal along line 309 to memory address counter 109. In blocks 513 and 515 a series of RD and WR signals cause memory address counter 109, CDRP 137, and CARP 139 to be incremented in response to an increment (IC) signal. Second comparator circuit 111 receives the new memory address from memory address counter 109 and the addresses of the boundaries of memory controller 107 from storage unit 105. Second comparator circuit 111 compares the new memory address with the boundary addresses of memory controller 107. If the signal which caused memory address counter 109 to be incremented was a RD instruction and if the new memory address stored in memory address counter 109 is between the boundary addresses of memory controller 107, then driver 113 is activated to transfer the data along bus 363 in response to the RD signal.

In block 513, control logic unit 135 issues a RD instruction causing the contents of the A address location and the D address location to be read. Logic unit 119 receives the data on A BUS 351 and D BUS 353 and executes the operating instruction on the data. The result of this execution is one word of processed data and control logic unit 135 causes this word of processed data to be stored, at block 517, in a register indicated by DRP 127. If the processed word of data overflows the register, the most significant bit of the processed word is temporarily stored in CY register 805 of logic unit 119 (block 519).

After processing one word of data, control logic unit 135 issues an IC signal along lines 311 and 315 to increment counters 137, 139, and 141 in counter unit 117. Generally, as in block 523, addresses in counter unit 117 are incremented by one. However, in the case of a shift right instruction the addresses are decremented by one as in blocks 521 and 529. The D address is always incremented or decremented as described above but incrementation or decrementation of the A address is dependent on the particular operating instruction. At blocks 515 and 531 the incremented or decremented D address is transferred on bus 365 to first comparator circuit 133 where it is compared with the boudary address stored thereat. At block 527, if a boundary has not been reached, first comparator circuit 133 issues a RPTE signal on line 301 to cause control logic unit 135 to initiate a new cycle, at block 513, to process another word of data. This new cycle processes data read from a new A address, a new D address, and CY register 805 of logic unit 119.

At block 533, the operating instruction has been fully executed if a boundary is reached. In the absence of a RPTE signal from first comparator circuit 133, control logic unit 135 fetches the next operating instruction specified in the initialization routine and causes that next operating instruction to be entered in instruction register 125. At block 535, all operating instructions have been executed, the processed data is output along bus 367, and CPU 101 enters an idle loop.

The initialization routine may be written to implement the capability of control logic unit 135 to decode operating instructions into a series of RD and WR instructions. Implementation of this capability in the preferred embodiment allows an initialization routine containing a single operating instruction with a single A address and a single D address to process up to eight words of data. If consecutive memory locations contain the data to be processed, then an operating instruction that prompts control logic unit 135 to issue a RD instruction accesses the next word of data without an initialization routine string of source addresses and destination addresses for each operating instruction.

Figure 17:
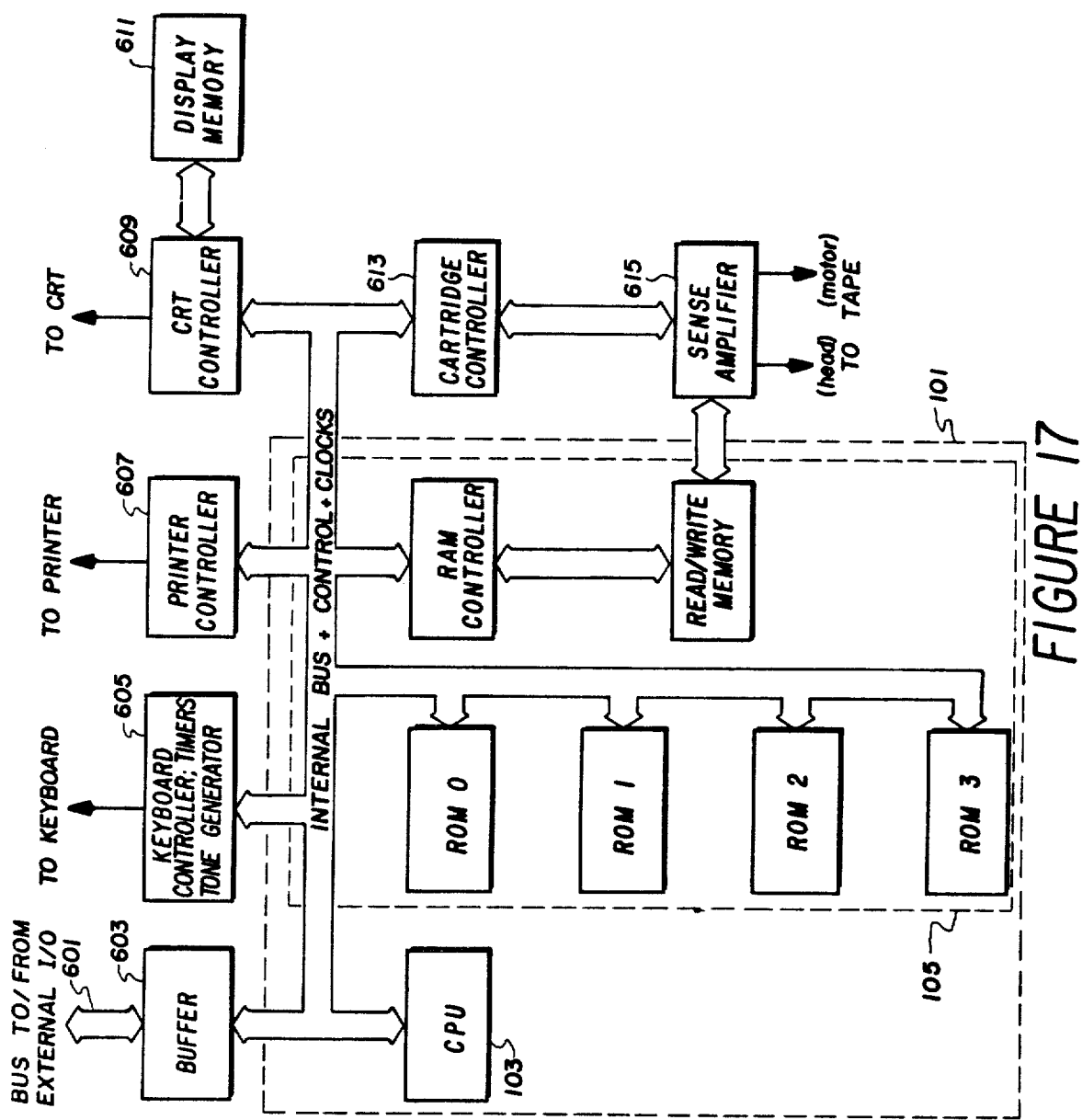
FIG. 17 is a diagram of the storage unit which is used in the CPU shown in FIG. 1.
Figure 16:
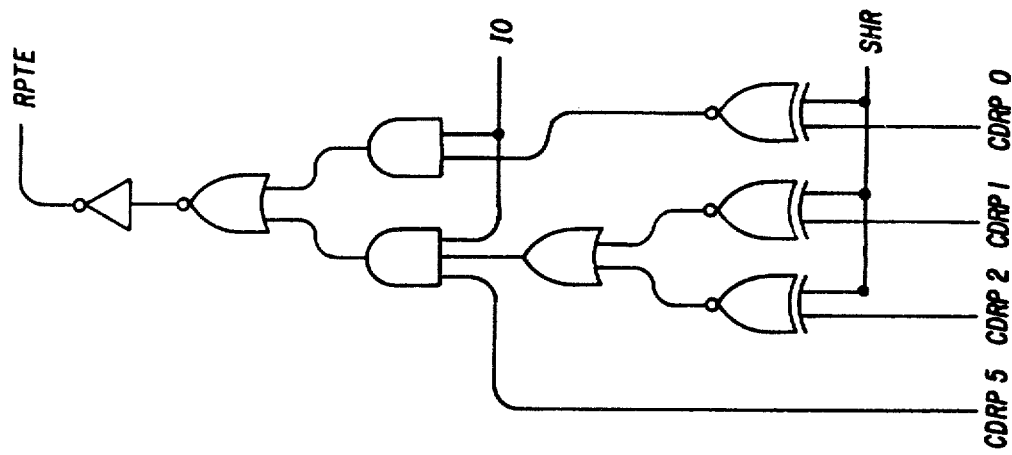
FIG. 16 illustrates the logic circuitry of the second comparator circuit which is used in the CPU shown in FIG. 1.

FIG. 17 illustrates the organization of a computer system which includes the preferred embodiment of CPU 101 and which is sold commercially as the Hewlett-Packard Company model 85A personal computer.

APPENDIX 1

INSTRUCTION TABLE

| INSTRUCTION | OP CODE | CYCLES | OPERATION |
|---|---|---|---|
| Load ARP (ARP n) | 00←n ≠ 1→ | 2 | ARP←n |
| Load ARP direct (RAR) | 00000001 | 3 | ARP←R[0] |
| Load DRP (DRP n) | 01←n ≠ 1→ | 2 | DRP←n |
| Load DRP direct (RDR) | 01000001 | 3 | DRP←R[0] |
| Set binary mode (BIN) | 230 | 4 | DCM←0 |
| Set decimal mode (BCD) | 231 | 4 | DCM←1 |
| Load (LD) | | | |
| Address mode | | | |
| Literal immediate | 250/251 | 4 + B | DR←M[PC +1] |
| direct | 260/261 | 5 + B | DR←M[ADR] |
| indirect | 270/271 | 7 + B | DR←M[M[ADR]] |
| Register immediate | 240/241 | 4 + B | DR←AR |
| direct | 244/245 | 5 + B | DR←M[AR] |
| indirect | 254/255 | 7 + B | DR←M[M[ADR]] |
| Index direct | 264/265 | 7 + B | DR←M[ADR + AR] |
| indirect | 274/275 | 9 + B | DR←M[M[ADR + AR]] |
| Store (ST) | | | |
| Address mode | | | |
| Literal immediate | 252/253 | 4 + B | M[PC + 1]←DR |
| direct | 262/263 | 5 + B | M[ADR]←DR |
| indirect | 272/273 | 7 + B | M[M[ADR]]←DR |
| Register immediate | 242/243 | 4 + B | AR←DR |
| direct | 246/247 | 5 + B | M[AR]←DR |
| indirect | 256/257 | 7 + B | M[M[AR]]←DR |
| Index direct | 266/267 | 7 + B | M[ADR + AR]←DR |
| indirect | 276/277 | 9 + B | M[M[ADR + AR]]←DR |
| Compare (CM) | | | |
| Address mode | | | |
| Literal immediate | 310/311 | 4 + B | DR + $\overline{M[PC + 1]}$ + 1 |
| direct | 320/321 | 5 + B | DR + $\overline{M[ADR]}$ + 1 |
| Register immediate | 300/301 | 4 + B | DR + $\overline{AR}$ + 1 |
| Direct | 330/331 | 5 + B | DR + $\overline{M[AR]}$ + 1 |

APPENDIX 1-continued

INSTRUCTION TABLE

| INSTRUCTION | OP CODE | CYCLES | OPERATION |
|---|---|---|---|
| Add (AD) | | | |
| Address mode | | | |
|   Literal immediate | 312/313 | 4 + B | DR←DR + M[PC + 1] |
|     direct | 322/323 | 4 + B | DR←DR + M[ADR] |
|   Register immediate | 302/303 | 4 + B | DR←DR + AR |
|     direct | 332/333 | 5 + B | DR←DR + M[AR] |
| Subtract (SB) | | | |
| Address mode | | | |
|   Literal immediate | 314/315 | 4 + B | DR←DR + $\overline{M[PC+1]}$ + 1 |
|     direct | 324/325 | 5 + B | DR←DR + $\overline{M[ADR]}$ + 1 |
|   Register immediate | 304/305 | 4 + B | DR←DR + $\overline{AR}$ + 1 |
|     direct | 334/335 | 5 + B | DR←DR + $\overline{M[AR]}$ + 1 |
| Logical AND (ANM) | | | |
| Address mode | | | |
|   Literal immediate | 317 | 4 + B | DR←DR·M[PC+1] |
|     direct | 327 | 5 + B | DR←DR·M[ADR] |
|   Register immediate | 302 | 4 + B | DR←DR·AR |
|     direct | 337 | 5 + B | DR←DR·M[AR] |
| Push (PU) | | | |
| Address mode | | | |
|   Increase stack direct | 344/345 | 5 + B | M[AR]←DR, AR←AR+B |
|     indirect | 354/355 | 7 + B | M[M[AR]]←DR,AR←AR+2 |
|   Decrease stack direct | 346/347 | 5 + B | AR←AR-B,M[AR]←DR |
|     indirect | 356/357 | 7 + B | AR←AR-2,M[M[AR]]←DR |
| Pop (PO) | | | |
| Address Mode | | | |
|   Increase stack direct | 342/343 | 5 + B | AR←AR-B,DR←M[AR] |
|     indirect | 352/353 | 7 + B | AR←AR-2,DR←M[M[AR]] |
|   Decrease stack direct | 340/341 | 5 + B | DR←M[AR], AR←AR + B |
|     indirect | 350/351 | 7 + B | DR←M[M[AR]], Ar←AR+2 |
| 1's or 9's Complement (NC) | 216/217 | 4 + B | DR←$\overline{DR}$ |
| 2's or 10's Complement (TC) | 214/215 | 4 + B | DR←$\overline{DR}$ + 1 |
| Increment (IC) | 210/211 | 4 + B | DR←DR + 1 |
| Decrement (DC) | 212/213 | 4 + B | DR←DR + $\overline{1}$ + 1 |
| Extended Left (EL) | | | |
| Logical Right (LR) | 206/207 | 4 + B | · $\xrightarrow{1}$ DR |
| Extended Right (ER) | 202/203 | 4 + B | e $\xrightarrow{1}$ DR |
| Logical Left (LL) | 204/205 | 4 + B | $\xleftarrow{1}$ · DR |
| Test (TS) | 220/221 | 4 + B | ←DR |
| Clear (CL) | 222/223 | 4 + B | DR←0 |
| Exclusive OR (XR) | 226/227 | 4 + B | DR←DR⊕AR |
| Inclusive OR (OR) | 224/225 | 4 + B | DR←DR v AR |
| Jump Subroutine (JSB) | | | |
| Address Mode | | | |
|   Literal direct | 316 | 9 | M[SP]←PC+3 |
| | | | SP←SP+2 |
| | | | PC←M[PC+1] |
|   Index direct | 306 | 11 | M[SP]←PC+3 |
| | | | SP←SP+2 |
| | | | PC←AR+M[PC+1] |
| Return from Subroutine (RTN) | 236 | 5 | SP←SP-2,PC←M[SP] |
| Save status (SAD) | 232 | 8 | Stack←all status except E |
| Restore status (PAD) | 237 | 8 | All status except E←stack |
| Increment E (ICE) | 234 | 2 | E←E+1 |
| Decrement E (DCE) | 223 | 2 | E←E-1 |
| Clear E (CLE) | 235 | 2 | E←0 |
| Relative Jump Group | | | |
| Jump unconditionally (JMP) | 360 | 4 + True | Jump always |
| Jump no overflow (JNO) | 361 | 4 + True | Jump if OVF = 0 |
| Jump Add (JOD) | 362 | 4 + True | Jump if LSB = 1 |
| Jump even (JEV) | 363 | 4 + True | Jump if LSB = 0 |
| Jump positive (JPS) | 365 | 4 + True | Jump if MSB = OVF |
| Jump negative (JNG) | 364 | 4 + True | Jump if MSB ≠ OVF |
| Jump zero | 367 | 4 + True | Jump if Z = 1 |
| Jump non-zero (JNZ) | 366 | 4 + True | Jump if Z = 0 |
| Jump E zero (JEZ) | 371 | 4 + True | Jump if E = 0000 |
| Jump E non-zero (JEN) | 370 | 4 + True | Jump if E ≠ 0000 |
| Jump carry (JCY) | 373 | 4 + True | Jump if CY = 1 |
| Jump no carry (JNC) | 372 | 4 + True | Jump if CY = 0 |
| Jump left digit zero (JLZ) | 374 | 4 + True | Jump if LDZ = 1 |

APPENDIX 1-continued

| INSTRUCTION | INSTRUCTION TABLE OP CODE | CYCLES | OPERATION |
|---|---|---|---|
| Jump left digit non-zero (JLN) | 375 | 4 + True | Jump if LDZ = 0 |
| Jump right digit zero (JRZ) | 376 | 4 + True | Jump if RDZ = 1 |
| Jump right digit non-zero (JRN) | 377 | 4 + True | Jump if RDZ = 0 |

Appendix 2

Table A2-1 contains the coded information necessary for programming control logic unit 135. Table A2-2 defines the various binary codes of each output column of Table A2-1. Table A2-3 relates inputs to control logic unit 135 and the outputs which result at each step.

Reading from left to right in Table A2-1, the first five-bit column of information indicates whether there is input from the HALT, TRUE, PWOP, RPTE, or IOKE signals. The second eight-bit column of information, headed by "I," codes the instructions input from instruction register 125. The five-bit STATE column codes the STATE input from the output matrix of control logic unit 135. The next nine columns of information are outputs from the output matrix of control logic unit 135 and are defined in Table A2-2 with the ABUSEL and DBUSEL headings shortened. The final column of information shows the number of the minterm which is active at that step. Each minterm transfers information from the input matrix of control logic unit 135 to the output matrix.

In Table A2-2, the various outputs from control logic unit 135 and their binary representations are defined. The outputs are shown in the same order as in Table A2-1. The number in brackets next to the output abbreviation designates the number of bits used to present the information.

Table A2-3 is organized by state values and gives the output and minterms active for each state value and input to control logic unit 135. Table A2-3 provides a shorthand version of the information in Table A2-1.

Table A2-1

```
HTPRI                                                   LU                       E  M
ARUPO   I        STATE  NEXT    DBUS  ABUS  ALUSEL     OR    MEM  PTR   NDCM   X  I
LUOTK                   STATE                          IA                      A  N
TEPEE   76543210 43210  43210   210   3210  543210     M     210  210   210    M  T
                                                                                  E
NPORT   FGHIJKLM ABCDE  AAAAA   AAA   AAAA  AAAAAA     AA    AAA  ABB   BBB    B  R
                        ABCDE   FGH   IJKL  MPQRST     UV    WXY  ZAB   CDE    F  M

..1..   ........ 00000  XX.XX   ...   ....  ......     ..    ..X  ...   ...    .  004
...0.   ........ 00.01  ..XXX   ...   ....  ...|..     ..    ...  ...   ...    .  005
.....   101...0. 00001  .....   ..X   .X.X  ......     .X    .X.  ...   ...    .  081
.....   1110.0.. 00001  .....   ..X   .X.X  ......     .X    .X.  ...   ...    .  082
.....   101...1. 00001  .....   ...   .XXX  ......     ..    X..  ...   ...    .  083
.....   1110.1.. 00001  .....   ...   .XXX  ......     ..    X..  ...   ...    .  084
.....   110..00. 00001  .....   ..X   .X.X  X..X.X     ..    .X.  ...   ...    .  085
.....   110..10. 00001  .....   ..X   .X.X  X..X.X     .X    .X.  ...   ...    .  086
.....   110..01. 00001  .....   ..X   .X.X  X..X..     .X    .X.  ...   ...    .  087
.....   110..111 00001  .....   ..X   .X.X  .X..X.     .X    .X.  ...   ...    .  088
.....   ........ 00001  ....X   ...   ....  ......     ..    ...  XX.   ...    X  007
.....   101010.. 00001  .....   ...   ....  ......     ..    ...  ...   X..    .  045
.....   11001... 00001  .....   ...   ....  ......     ..    ...  ...   X..    .  046
.....   ........ 00010  ..XXX   ...   .X.X  ...XX.     ..    .X.  ...   ...    X  055
.....   .1...... 00010  .....   ...   ....  ......     ..    ...  ...   .XX    .  110
.....   1....... 00010  .....   ...   ....  ...XXX     ..    ...  ...   ...    .  113
.....   .1...... 00011  .....   ...   ....  ...X.X     ..    ...  ...   ...    .  054
.....   ........ 00011  ...X.   ...   .X.X  ......     X.    .X.  X.X   .X.    .  109
.....   1011.0.. 00100  ....X   ...   ....  ......     ..    .XX  ...   X..    .  044
.....   1010.1.. 00100  ....X   ...   ....  ......     ..    ..X  ...   ..X    .  008
.....   1011.1.. 00100  ....X   .XX   .XX.  X.....     .X    ..X  ...   ...    .  075
.....   11010... 00100  ....X   ...   ....  ......     ..    .XX  ...   X..    .  077
.....   1110..0. 00100  ....X   ...   ....  X.....     .X    ..X  ...   ..X    .  078
.....   1110..1. 00100  ....X   ...   ....  X....X     .X    ..X  ...   ...    .  079
.....   11011... 00100  ....X   ...   ....  ......     ..    ..X  ...   ..X    .  096
.....   ..1.1... 00100  .X..X   ...   ....  ......     ..    ...  ...   ...    .  080
.....   ........ 00101  ..X.X   ...   ....  ......     ..    ...  XXX   ...    X  009
.....   101...0. 00101  .....   ..X   .XX.  ......     .X    ...  ...   ...    .  069
.....   110..00. 00101  .....   ..X   .XX.  X..X.X     ..    ...  ...   ...    .  070
.....   110..10. 00101  .....   ..X   .XX.  X..X.X     .X    ...  ...   ...    .  071
.....   110..01. 00101  .....   ..X   .XX.  X..X..     .X    ...  ...   ...    .  072
.....   110..111 00101  .....   ..X   .XX.  .X..X.     .X    ...  ...   ...    .  073
.....   101...1. 00101  .....   ...   .XXX  ......     .X    ...  ...   ...    .  074
...0.   ........ 00110  ..XXX   ...   ....  ......     ..    ...  ...   ...    .  006
.....   1001010. 00110  ..XX.   ..X   .XX.  .X.XXX     .X    ...  XXX   ...    X  056
.....   1001011. 00110  ..XX.   ..X   .XX.  .X.X.X     .X    ...  XXX   ...    X  057
.....   1000100. 00110  ..XX.   ..X   ....  X..X..     .X    ...  XX.   ...    X  058
.....   1000101. 00110  ..XX.   ..X   ....  X..X.X     .X    ...  XX.   ...    X  059
.....   1001000. 00110  ..XX.   ...   .XXX  ......     ..    ...  XX.   ...    X  060
```

```
..... 1001001. 00110  ..XX.  ...X  ....  .......  .X  ...  XX.  ...  X 061
..... 100011.. 00110  ..XX.  ...X  .XXX  X..XXX   .X  ...  XX.  ...  X 062
..... 10000.0. 00110  ..XX.  ...X  .XXX  ...X...  .X  ...  XX.  ...  X 063
..... 10000.1. 00110  ..XX.  ...X  .XXX  ...X..X  .X  ...  .X.  ...  X 064
..... ........ 00111  X...X  X..   .X..  XXX....  .X  ..X  ...  XX.  . 048
..... ........ 01000  ..XXX  ...   ....  ...X.X.  ..  X..  ...  ...  . 050
..... ........ 01001  XX.X.  ...   ....  .......  ..  .XX  ...  ...  . 097
..... .......0 01010  XX...  XXX   ....  X....X   .X  ..X  ...  ...  . 094
..... .......1 01010  .XXXX  XXX   ....  X....X   .X  ..X  ...  ...  . 107
....1 ........ 01011  X..XX  X.X   ....  X......  ..  X..  ...  ...  . 012
....0 .0...... 01011  .X...  ...   ..X.  X......  ..  X..  ...  ...  . 091
....0 .1...... 01011  X..XX  X.X   ....  X......  .X  X..  ...  ...  . 092
1.... ........ 01100  .XX..  ...   ....  .......  ..  ...  ...  ...  . 112
0.... ........ 01100  X...X  X..   .X..  XX.....  .X  ..X  ...  XX.  . 035
....0 1100.110 01101  ....   ...   ....  .......  ..  ...  ...  X..  . 047
..... ........ 01101  X.XX.  XXX   ....  X......  .X  ..X  ...  ..X  . 105
..... ........ 01110  X....  X.X   .X.X  .......  .X  .XX  ...  XX.  . 108
....0 ....01.. 01110  X.X.X  ...   ....  .......  ..  ...  ...  ...  . 093
..... ........ 01111  ...XX  ...   .X.X  .......  X.  .X.  X..  ...  X 095
1.... ........ 10000  .XX..  ...   ....  .......  ..  XX.  ...  ...  . 003
0.... ........ 10000  XX..X  ...   .X.X  .......  X.  .X.  ..X  ...  . 001
.....0 ........ 10001 X....  ...   ....  X......  .X  ..X  ...  XX.  . 101
..... ........ 10010  XX...  ...   ....  X....X   ..  ..X  ...  ...  . 051
....0 ........ 10010  XX...  ...   ....  .......  ..  ..X  ...  ...  . 099
....1 ........ 10011  X.X.   X..   ...X  XX...X   ..  ..X  ...  ...  . 067
....0 ........ 10011  X.X.   ...   ....  .......  ..  XXX  ...  ...  . 102
....1 ........ 10011  X.X.   ...   ....  .......  ..  XXX  ...  ...  . 065
..... ........ 10100  X....  ...   ....  .......  ..  ...  X.X  ...  . 065
..... ........ 10101  XXXX   X..   .XX.  XX....   .X  ..X  .XX  ...  . 106
....1 ........ 10110  .X.XX  X..   .X..  XX....   ..  X..  ...  ...  . 011
....0 10011010 10110  .X.XX  ...   ..X.  .......  ..  X..  ...  ...  . 089
....0 110..110 10110  .X.XX  X..   ..X.  X...X    .X  ...  ...  ...  . 090
..... ........ 10111  ..XXX  X.X   ....  X...X    .X  ...  ...  ...  . 053
..... ........ 11000  .XXX.  X..   .X.X  .......  .X  .XX  ...  ...  . 111
.1..0 1111....  11001 X.XXX  X..   .X.X  XX....   .X  .X.  ...  ...  . 002
....1 ........ 11001  .XX.X  XX.   ...X  XXX...   .X  ..X  ...  ..X  . 010
....0 1011.1.. 11001  XXX.X  .X.   .X.X  .......  .X  .X.  ...  X..  . 021
....0 11010... 11001  ..X..  ...   ....  .......  ..  .XX  ...  X..  . 022
....0 1011.0.. 11001  ..X..  ...   ....  .......  ..  .XX  ...  X..  . 025
....0 1010.1.. 11001  ..X..  ...   ....  .......  ..  ..X  .XX  ..X  . 026
....0 1110..0. 11001  ..X..  ...   ....  XXX...   .X  ..X  .XX  ..X  . 029
....0 1110..1. 11001  ..X..  ...   ....  XX...X   .X  ..X  .XX  ...  . 030
....0 1100.110 11001  .XX.X  XX.   ...X  XXX...   .X  ..X  ...  X.X  . 036
....0 10011010 11001  .XX.X  XX.   ...X  XXX...   .X  ..X  ...  ..X  . 037
....0 1001111. 11001  .X.X.  XX.   ...X  XX...X   .X  ..X  ...  ...  . 068
....0 11011... 11001  .X...  ...   ....  .......  ..  ..X  .XX  ..X  . 076
....0 01...... 11001  X....  ...   ....  .......  ..  ...  X.X  X..  . 013
....0 00...... 11001  X....  ...   ....  .......  ..  ...  X..  X..  . 014
....0 01000001 11001  X.X..  ...   XXX.  .......  ..  X..  ...  ...  . 015
....0 00000001 11001  XXX..  ...   XXX.  .......  ..  X..  ...  ...  . 016
....0 110...0. 11001  .....  ...   ....  ...X.X   ..  ...  ...  ...  . 017
....0 110..01. 11001  .....  ...   ....  .......  ..  ...  ...  ...  . 018
....0 101000.. 11001  ..X.X  ...   ....  .......  ..  ...  ...  ...  . 019
....0 11000... 11001  ..X.X  ...   ....  .......  ..  ...  ...  ...  . 020
....0 101010.. 11001  ...,X  ...   ....  .......  ..  ...  ...  ...  . 023
....0 11001... 11001  ...,X  ...   ....  .......  ..  ...  ...  ...  . 024
....0 11101... 11001  .....  ...   ....  ..X....  ..  ...  ...  ...  . 027
....0 11100..1 11001  .....  ...   .XX.  .......  ..  ...  ...  ...  . 028
....0 10001.0. 11001  ..XX.  ...   ....  ...X.X   ..  ...  ...  ...  . 031
....0 10001.1. 11001  .....  ...   ....  ...X.X   ..  ...  ...  ...  . 032
....0 100001.. 11001  .....  ...   ....  .......  ..  ...  ...  ...  . 033
....0 100.0... 11001  ..XX.  ...   ....  .......  ..  ...  ...  ...  . 034
....0 10011000 11001  ..XXX  ...   ....  .......  ..  ...  ...  .X.  . 038
....0 10011001 11001  ..XXX  ...   ....  .......  ..  ...  ...  .XX  . 039
....0 10011011 11001  X....  ...   ....  ...XX    ..  ...  ...  X..  . 040
....0 10011100 11001  X....  ...   ....  ...X.    ..  ...  ...  X..  . 041
....0 10011101 11001  X....  ...   ....  ...X.    ..  ...  ...  X..  . 042
....0 1111.... 11001  ..XXX  ...   .X..  .......  ..  ...  ...  X..  . 043
....0 10011111 11001  .....  ...   .X..  .......  ..  ...  ...  ...  . 104
..... ........ 11010  .....  ...   ....  ...X     ..  ...  .XX  ...  . 098
..... ........ 11011  XX...  ...   ....  .......  ..  X..  ...  ...  . 100
..... ........ 11100  .....  ...   ....  .......  ..  ...  ...  ...  . 066
..... ........ 11101  XXXXX  .XX   .X.X  .......  .X  .X.  ...  X..  . 103
..... ........ 11110  X....  X.X   .XX.  XX....   .X  ..X  .XX  ...  . 052
..... ........ 11111  ..X..  .X.   .XX.  XX....   .X  ..X  .XX  ...  . 049
```

TABLE A2-2

OUTPUTS

NEXT STATE [5]
ABUSEL [4] ABUS select
- X000 ZERO — the constant 0
- 0001 ONE — the constant 1
- X010 ARP/DRP ⎫ ME BUS — whether ARP or DRP depends on state
- X011 M-1 ⎭
- X100 N REG — N register
- X101 BUS (external)
- 0110 AR — register pointed to by ARP counter
- 0111 DR — register pointed to by DRP counter
- 1001 TWO — the constant 2
- 1110 R[0] — register 0

DBUSEL [3] DBUS select
- 000 AR — register pointed to by ARP counter
- 001 DR — register pointed to by DRP counter
- 010 XL — low byte index scratch register (2)
- 011 XH — high byte index scratch register (3)
- 100 PCL — low byte program counter (4)
- 101 PCH — high byte program counter (5)
- 110 SPL — low byte stack pointer (6)
- 111 SPH — high byte stack pointer (7)

ALUSEL [6] ALU select
(x is either 0 or 1)
octal
- 00 MVA — move ABUS through ALU
- 01 CLRE — clear E
- 02 INCE — increment E
- 03 DCRE — decrement E
- 04 CCY — clear carry
- 05 SCY — set carry
- 06 RDZLD — right digit zero load
- 07 SOV — set overflow
- 10 SHL (MVA) — shift left, move ABUS through ALU
- 11 SHR (MVA) — shift right, move ABUS through ALU
- 12 STATUS — status to TBUS
- 22 AND — logical AND
- 25 XOR — logical exclusive-OR
- 27 IOR — logical inclusive-OR
- 40 ADBC — add binary with carry
- 41 CADBC — complement ABUS, add binary with carry
- 42 SADBC — special binary add with carry (extends MSB)
- 44 ADC — add with carry
- 45 CADC — complement ABUS, add with carry
- 47 CADS — complement ABUS, add special (clears DBUS into ALU)
- 60 ADB0 — add binary, carry = 0
- 61 CADB0 — complement ABUS, binary add, carry = 0
- 70 ADB1 — binary add, carry = 1
- 71 CADB1 — complement ABUS, binary add, carry = 1

MEM [3] External Memory Control
- 000 NOP — no bus operation
- 001 LMA — load memory address
- 010 RD — read memory
- 011 LMRD — load memory address and read memory
- 100 WR — write
- 101 — — not used
- 110 RDWR — DMA grant
- 111 LMRW — interrupt acknowledge (intack)

LDI [1] Load instruction register with TBUS
WRAM [1] Write TBUS into RAM
EXAM [1] Update status register PTR [3] Address Pointer Control
- 000 NOP — no operation
- 001 LDAD — load ARP & DRP counters (CARP and CDRP)
- 010 DECD — decrement DRP counter (CDRP)
- 011 INCA — increment ARP counter (CARP)
- 100 LARP — Load ARP
- 101 LDRP — Load DRP
- 110 INCD — increment DRP counter
- 111 INCAD — increment ARP & DRP counter NDCM [3] N counter, decimal mode control, output multiplexer
- 000 NOP, T-OUT — no operation, select TBUS
- 001 NOP, D-OUT — no operation, select DBUS
- 010 CDCM, T-OUT — clear DCM flip flop, select TBUS
- 011 SDCM, D-OUT — set DCM flip flop, select DBUS
- 100 INN, T-OUT — increment N counter, select TBUS

TABLE A2-2-continued

| OUTPUTS | |
|---|---|
| 101 INN, D-OUT | -increment N counter, select DBUS |
| 110 CLN, T-OUT | -clear N counter, select TBUS |
| 111 CLN, D-OUT | -clear N counter, select DBUS |

TABLE A2-3

FLOWCHART

| STATE | INPUTS | OUTPUTS | NEXT STATE | MINTERMS ACTIVE |
|---|---|---|---|---|
| 0 | PWOP | LMA, BUS = 0, T-OUT | 33 | 4 |
| 1 | LD | RD, DR = BUS, INCD, EXAM | 1 | 7,81 |
| 1 | POP | RD, DR = BUS, INCD, EXAM | 1 | 7,82 |
| 1 | ST | WR, BUS = DR, INCD, EXAM | 1 | 7,83 |
| 1 | PUSH | WR, BUS = DR, INCD, EXAM | 1 | 7,84 |
| 1 | CM | RD, TBUS = DR + $\overline{BUS}$ + CYAR,INCD,EXAM | 1 | 7,85 |
| 1 | SB | RD, DR = DR + $\overline{BUS}$ + CYAR,INCD,EXAM | 1 | 7,86 |
| 1 | AD | RD, DR = DR + BUS + CYAR,INCD,EXAM | 1 | 7,87 |
| 1 | AND | RD, DR = DR (and) BUS,INCD,EXAM | 1 | 7,88 |
| 1 | Literal mode | INN | | 45,46 |
| 1 | $\overline{RPTE}$ | | 7 | 5 |
| 2 | Bit 17=1 | SOV | | 113 |
| 2 | Bit 16=1 | SDCM | | 110 |
| 2 | | RD, TBUS = BUS, RDZLD, EXAM | 7 | 55 |
| 3 | | RD, I = BUS, LDRP, CDCM | 2 | 109 |
| 3 | Bit 16=1 | SCY | | 54 |
| 4 | Lit@ or Lit@@ | LMRD, INN | 1 | 44,77 |
| 4 | Reg@ or Reg@@ | LMA, BUS = AR, D-OUT | 1 | 8,96 |
| 4 | Inx@ or Inx@@ | LMA, XH = XH ++ AR ++ CYAD, T-OUT | 1 | 75 |
| 4 | Incr stk pointer | LMA, AR = AR ++ 0 ++ CYAD, D-OUT | 1 | 78 |
| 4 | Decr stk pointer | LMA, AR = AR ++ $\bar{0}$ ++ CYAD, T-OUT | 1 | 79 |
| 4 | @@ | | 9 | 80 |
| 5 | LD | DR = AR, INCAD, EXAM | 5 | 9,69 |
| 5 | CM | TBUS = DR + $\overline{AR}$ + CYAR, INCAD, EXAM | 5 | 9,70 |
| 5 | SB | DR = DR + $\overline{AR}$ + CYAR, INCAD, EXAM | 5 | 9,71 |
| 5 | AD | DR = DR + AR + CYAR, INCAD, EXAM | 5 | 9,72 |
| 5 | AND | DR = DR (and) AR, INCAD, EXAM | 5 | 9,73 |
| 5 | $\overline{RPTE}$ | | 7 | 5 |
| 6 | OR | DR = DR (or) AR, INCAD, EXAM | 6 | 56 |
| 6 | XR | DR = DR (xor) AR, INCAD, EXAM | 6 | 57 |
| 6 | INC | DR = DR + 0 + CYAR, INCD, EXAM | 6 | 58 |
| 6 | DEC | DR = DR + $\bar{0}$ + CYAR, INCD, EXAM | 6 | 59 |
| 6 | TS | TBUS = DR, INCD, EXAM | 6 | 60 |
| 6 | CL | DR = 0, INCD, EXAM | 6 | 61 |
| 6 | TC or NC | DR = 0 + $\overline{DR}$ + CYAR, INCD, EXAM (special add #1) | 6 | 62 |
| 6 | Left shift | DR = (SHL) DR, INCD, EXAM | 6 | 63 |
| 6 | Right shift | DR = (SHR) DR, DECD, EXAM | 6 | 64 |
| 6 | $\overline{RPTE}$ | | 7 | 6 |
| 7 | | LMA,PCL = PCL ++ N ++ CY1,CLN,T-OUT | 21 | 48 |
| 10 | | WR, BUS = <MSB,$\overline{LDZ}$,000,$\overline{Z}$,$\overline{RDZ}$,LSB> (status) | 7 | 50 |
| 11 | | LMRD | 32 | 97 |
| 12 | Bit 10=0 (RTN) | LMA, SPH = SPH ++ $\bar{0}$ ++ CYAD,T-OUT | 30 | 94 |
| 12 | Bit 10=1 (PAD) | LMA, SPH = SPH ++ $\bar{0}$ ++ CYAD,T-OUT | 17 | 107 |
| 13 | IOKE | WR, BUS = PCH ++ 0 ++ CYAD | 23 | 12 |
| 13 | $\overline{IOKE}$, Bit 16=0 (SAD) | WR, BUS = <OVF,DCM,DRP> | 10 | 91 |
| 13 | $\overline{IOKE}$, Bit 16=1 (JSB) | WR, PCH = PCH ++ 0 ++ CYAD BUS = TBUS | 23 | 92 |
| 14 | HALT | | 14 | 112 |
| 14 | $\overline{HALT}$ | LMA,PCL = PCL ++ N ++ CY0,CLN,T-OUT | 21 | 35 |
| 15 | $\overline{IOKE}$, JSB | INN | | 47 |
| 15 | | LMA, SPH = SPH ++ 0 ++ CYAD, D-OUT | 26 | 105 |
| 16 | | LMRD, PCH = BUS, CLN | 20 | 108 |
| 16 | I3=0, I2=1 (JSBX) | | 25 | 93 |
| 17 | | RD, I = BUS, LARP, EXAM (note: CYAR=0, OVF=0) | 3 | 95 |
| 20 | $\overline{HALT}$ | RD, I = BUS, LDAD | 31 | 1 |
| 20 | HALT | RDWR (DMA grant) | 14 | 3 |
| 21 | | LMA, PCH = PCH ++ 0 ++ CYAD, T-OUT | 20 | 101 |

TABLE A2-3-continued

FLOWCHART

| STATE | INPUTS | OUTPUTS | NEXT STATE | MINTERMS ACTIVE |
|---|---|---|---|---|
| 22 | $\overline{IOKE}$ | LMA,BUS = PCH ++ $\bar{0}$ ++ CYAD,CLN,T-OUT | 30 | 51 |
| 22 | IOKE | LMA, BUS = 0, T-OUT | 30 | 99 |
| 23 | $\overline{IOKE}$ | LMA, BUS = PCL ++ $\bar{1}$ ++ CY0 T-OUT | 22 | 67 |
| 23 | IOKE | LMRW (interrupt acknowledge) | 22 | 102 |
| 24 | | LDRP | 20 | 65 |
| 25 | | LMA,PCL = PCL ++ AR ++ CY0,INCA,T-OUT | 36 | 106 |
| 26 | IOKE | WR, BUS = PCL ++ N ++ CY0 | 13 | 11 |
| 26 | $\overline{IOKE}$, SAD | WR, BUS = <OVF,CYAR,ARP> | 13 | 89 |
| 26 | $\overline{IOKE}$, JSB | WR, PCL = PCL ++ N ++ CY1, BUS=TBUS | 13 | 90 |
| 27 | | PCH = PCH ++ MSBx8 ++ CYAD (special add #2) | 7 | 53 |
| 30 | | LMRD, PCL = BUS | 16 | 111 |
| 31 | IOKE | LMA, SPL = SPL ++ 1 ++ CY1, D-OUT | 15 | 10 |
| 31 | $\overline{IOKE}$, LDP | LDRP, INN | 20 | 13 |
| 31 | $\overline{IOKE}$, LAP | LARP, INN | 20 | 14 |
| 31 | $\overline{IOKE}$, LDP indirect | LDRP, INN, I = R[0] | 24 | 13,15 |
| 31 | $\overline{IOKE}$, LAP indirect | LARP, INN, I = R[0] | 34 | 14,16 |
| 31 | $\overline{IOKE}$, CM or SB | SCY | | 17 |
| 31 | $\overline{IOKE}$, AD | CCY | | 18 |
| 31 | $\overline{IOKE}$, Reg. Imm. | | 5 | 19,20 |
| 31 | $\overline{IOKE}$, Inx@ or Inx@@ | RD, XL = BUS, INN | 35 | 21 |
| 31 | $\overline{IOKE}$, Lit@ or Lit@@ | LMRD, INN | 4 | 22,25 |
| 31 | $\overline{IOKE}$, Lit. Imm. | | 1 | 23,24 |
| 31 | $\overline{IOKE}$, Reg@ Reg@@ | LMA, BUS = AR, INCA, D-OUT | 4 | 26,76 |
| 31 | $\overline{IOKE}$, PU or PO @@ | ABUS = 1 | | 27 |
| 31 | $\overline{IOKE}$, PUM or POM @ | ABUS = M−1 | | 28 |
| 31 | $\overline{IOKE}$, PU or PO, +ADR | LMA,AR = AR ++ ABUS ++ CY1,INCA,D-OUT | 4 | 29 |
| 31 | $\overline{IOKE}$, PU or PO, −ADR | LMA,AR = AR ++ $\overline{ABUS}$ ++ CY0,INCA,T-OUT | 4 | 30 |
| 31 | $\overline{IOKE}$, INC or TC | SCY | 6 | 31 |
| 31 | $\overline{IOKE}$, DEC or NC | CCY | 6 | 32 |
| 31 | $\overline{IOKE}$, Logical shift | SHL, ABUS = 0 (clears CYAR or E) | | 33 |
| 31 | $\overline{IOKE}$, XR,OR,CL,TS,LL LR,EL, or ER | | 6 | 34 |
| 31 | $\overline{IOKE}$, JSB | LMA,SPL = SPL ++ 1 ++ CY1,INN,D-OUT | 15 | 36 |
| 31 | $\overline{IOKE}$, SAD | LMA, SPL = SPL ++ 2 ++ CY1, D-OUT | 15 | 37 |
| 31 | $\overline{IOKE}$, BIN | CDCM | 7 | 38 |
| 31 | $\overline{IOKE}$, BCD | SDCM | 7 | 39 |
| 31 | $\overline{IOKE}$, DCE | DCRE, INN | 20 | 40 |
| 31 | $\overline{IOKE}$, ICE | INCE, INN | 20 | 41 |
| 31 | $\overline{IOKE}$, CLE | CLRE, INN | 20 | 42 |
| 31 | $\overline{IOKE}$, Cond. jump | INN | 7 | 43 |
| 31 | $\overline{IOKE}$, TRUE, Cond. jump | RD, PCL = PCL ++ BUS ++ CY0, INN | 27 | 2,43 |
| 31 | $\overline{IOKE}$, RTN | LMA, SPL = SPL ++ $\bar{1}$ ++ CY0, T-OUT | 12 | 68 |
| 31 | $\overline{IOKE}$, PAD | LMA, SPL = SPL ++ $\bar{2}$ ++ CY0, T-OUT | 12 | 68,104 |
| 32 | | LMRD | 1 | 98 |
| 33 | | LMA, BUS = 0, I = TBUS, T-OUT | 30 | 100 |
| 34 | | LARP | 20 | 66 |
| 35 | | RD, XH = BUS, INN | 37 | 103 |
| 36 | | LMA, PCH = PCH ++ AR ++ CYAD, T-OUT | 20 | 52 |

TABLE A2-3-continued

| | | FLOWCHART | NEXT | MINTERMS |
|---|---|---|---|---|
| STATE | INPUTS | OUTPUTS | STATE | ACTIVE |
| 37 | | LMA,XL = XL + + AR + + CY0,INCA,T-OUT | 4 | 49 |

NOTATION
+ binary addition if DCM=0; decimal addition if DCM=1
+ + binary addition
@ direct addressing
@@ indirect addressing
x̄ one's complement of x
special add #1 - DBUS is cleared
special add #2 - all ABUS bits are set the same as the MSB of the previous cycle (ie. sign extend)

I claim:

1. A processor for performing an operating instruction upon first and second strings of data, the processor comprising:
    an instruction register for storing the operating instruction;
    a first register group for storing the first data string such that a least significant word is stored in a 0-th register and a most significant word is stored in an n-th register;
    a second register group for storing the second data string such that a least significant word is stored in a 0-th register and a most significant word is stored in an n-th register;
    a first counter for storing a source address of a source word located within the first register group;
    a second counter for storing a destination address of a destination word located within the second register group;
    initializing means, coupled to the first and second counters, for initially setting the first counter to the 0-th register address of the first register group and for initially settting the second counter to the 0-th register address of the second register group;
    comparator means, coupled to the second counter means and to the second register group, for generating a repeat signal as long as the destination address is less than or equal to the address of the second register group n-th register;
    logic means, coupled to the instruction register, the first and second register groups, the first and second counters, the initializing means, and the comparator means, the logic means being operative for receiving the repeat signal and in response thereto for performing the operating instruction upon the source word and the destination word and for storing a resultant word at the destination address, the logic means being further operative for detecting an absence of a repeat signal and in response to such absence for storing another first data string in the first register, for storing another second data string in the second register group, and for causing the initializing means to initialize the first and second register groups;
    incrementing means, coupled to the logic means and to the first and second counters, for incrementing the first and second counters after the logic means performs the operating instruction;
    a carry register coupled to the logic means for storing a carry bit generated by the logic means during the performance of the operating instruction;
    shift means, coupled to the logic means and to the first and second register groups, for shifting bits within the source word and the destination word; and,
    an extend register, coupled to the logic means and to the first and second register groups, for storing a portion of a word truncated by the shift means.

2. A processor as in claim 1, wherein the first and second register groups comprise two-read/one-write memory cells.

3. A processor as in claim 2, further comprising a complementing means coupled to the logic means and to the first and second register groups for complementing the source word and the destination word.

* * * * *